United States Patent [19]

Stange et al.

[11] 4,050,688
[45] Sept. 27, 1977

[54] ORTHOGONAL DOCUMENT HANDLING APPARATUS

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[21] Appl. No.: 649,389

[22] Filed: Jan. 15, 1976

[51] Int. Cl.$^2$ .............................................. B65H 5/22
[52] U.S. Cl. .................................... 271/5; 271/9; 271/97; 271/173; 271/184; 271/195; 271/225
[58] Field of Search .................... 271/3, 5, 9, 97, 64, 271/173, 195, 225, 184, 226, 236; 353/25, 27; 360/88, 91; 209/74, 80.5

[56] References Cited

U.S. PATENT DOCUMENTS

| | | | |
|---|---|---|---|
| 3,180,933 | 4/1965 | Shaler | 271/225 UX |
| 3,334,785 | 8/1967 | Grabowski | 360/88 X |
| 3,406,382 | 10/1968 | Wilmer | 271/9 X |
| 3,659,837 | 5/1972 | Umahashi | 271/9 |
| 3,834,799 | 9/1974 | Blosser | 271/195 X |

*Primary Examiner*—Richard A. Schacher
*Attorney, Agent, or Firm*—Carlos Nieves; James J. Ralabate

[57] ABSTRACT

A system for presenting documents to a xerographic exposure station includes a first fluidic storage station in which a rack for storing documents is located. The rack includes a plurality of pockets in each of which a document may be stored, the rack being movable in a vertical direction. A fluid stream is used to move a document in a pocket out of the storage apparatus through an opening and into orthogonal registration at the exposure station. Exposed documents are fluidically moved to a second fluidic storage station which is similar to the first, the exiting direction being generally transverse to the path followed by a document in entering the exposure station. Vertical movement of the racks at the first and second storage stations is used to serially feed documents to the exposure stations and to provide a pocket for each of the exposed documents.

12 Claims, 7 Drawing Figures

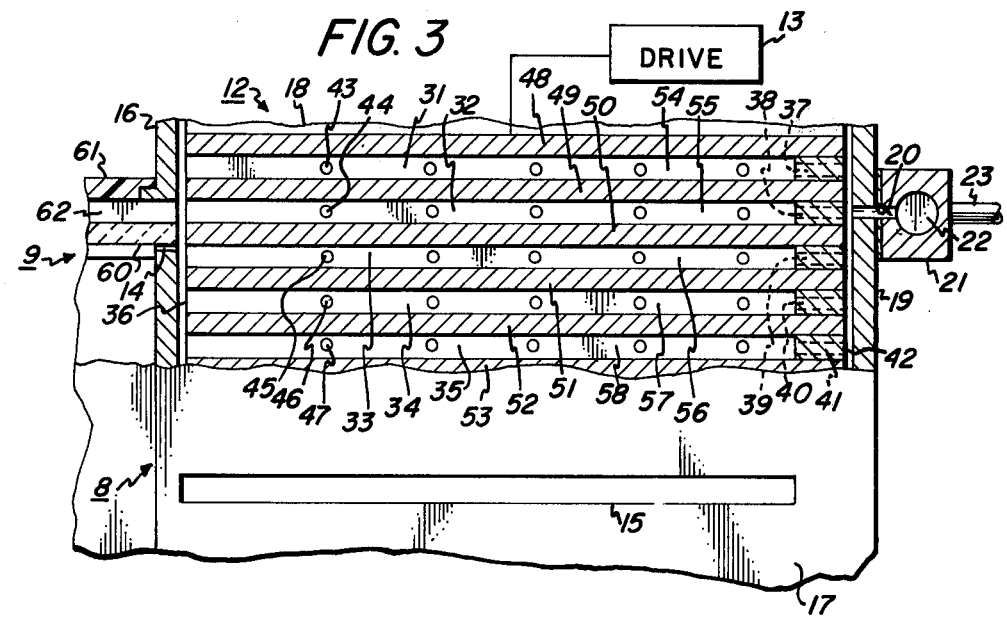
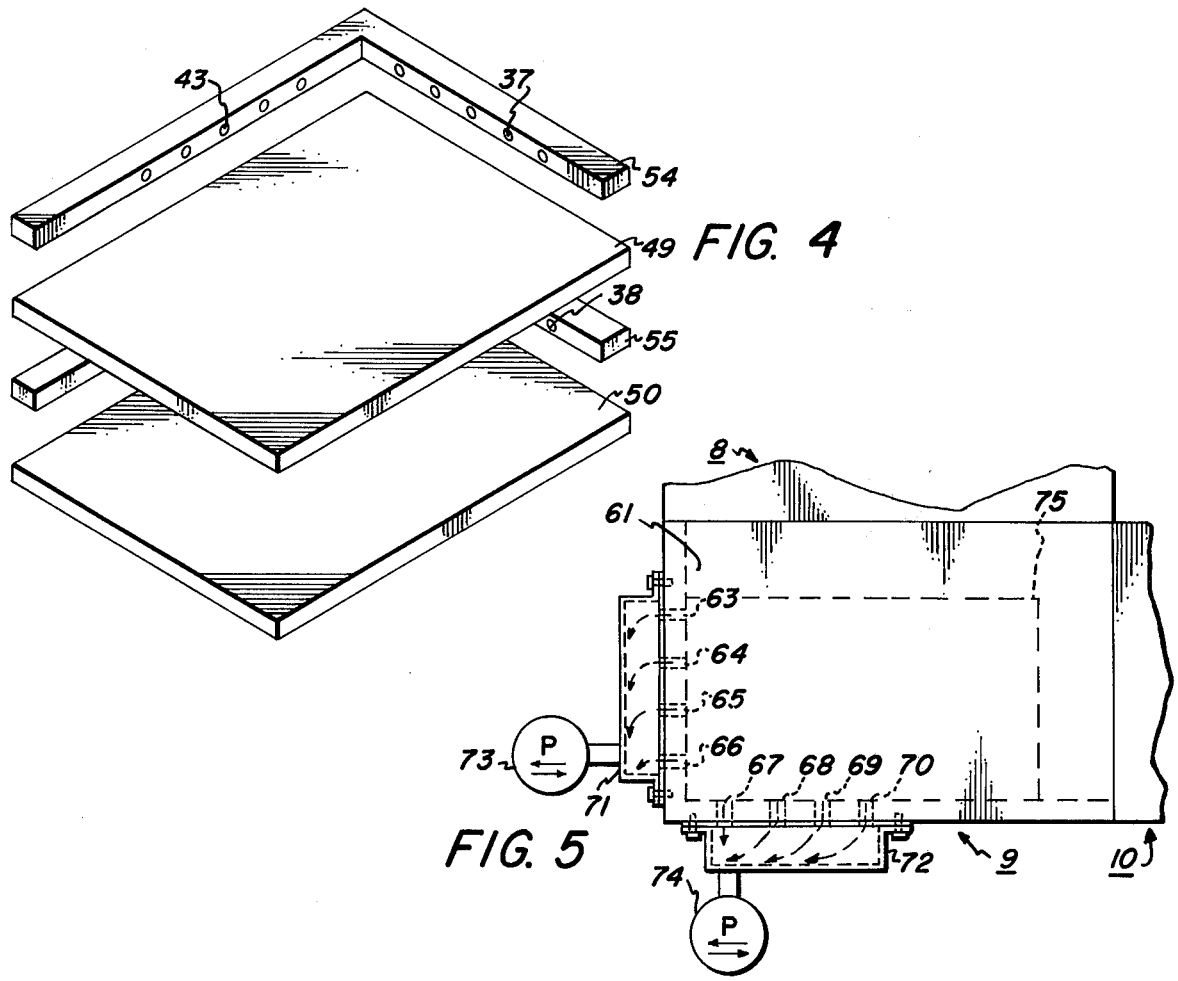

ORTHOGONAL DOCUMENT HANDLING APPARATUS

The subject invention relates to apparatus for feeding documents to an exposure station, such as is used in copying equipment, and for storing exposed documents. In addition, the invention relates to fluidic transports and document handling apparatus, such as is respectively disclosed in co-pending U.S. patent application Ser. No. 627,571, Pneumatic Registration Apparatus, filed on Oct. 31, 1975, on an invention by Klaus K. Stange, and co-pending U.S. patent application Ser. No. 638,590 Document Handling Apparatus, filed on Dec. 8, 1975, on an invention by Klaus K. Stange, et al, the applications having been assigned to the assignee herein, Xerox Corporation.

The public is aware of apparatus for storing and feeding documents wherein documents are stored in a bin and drive rollers engaging the top or bottom of the stack serially discharge the documents from the bin. Documents thus handled may be transported to an exposure station, such as is used in xerographic machines, and thereafter are usually moved into a collecting tray. In such apparatus frictional forces cause the documents to rub against each other and when the documents are repeatedly subjected to such treatment images on the documents and the documents themselves deteriorate.

It is an object of the present invention to provide document handling apparatus for storing documents in superposed fashion and for serially delivering the documents, fluidically, to an exposure station.

It is another object of the present invention to provide document handling apparatus for fluidically feeding documents to an exposure station and for fluidically moving documents received from an exposure station into storage apparatus.

Briefly, the invention disclosed herein provides document handling apparatus. Structurally, the apparatus includes (a) an exposure station; (b) first means for fluidically moving a document in a first direction into registration at the exposure station; and (c) second means for fluidically moving said document in a second direction out of the exposure station, said first and second directions being transversely related.

Additional objects and features of the invention will become apparent by reference to the following description in conjunction with the accompanying drawings, in which:

FIG. 3 is a partial view of a storage station of the apparatus, a section of the view having been taken along lines 3—3 in FIG. 2;

FIG. 4 is a partial exploded view of a storage rack of the storage station;

FIG. 5 is a top-plan view of an exposure station of the document handling apparatus;

Figure 1:
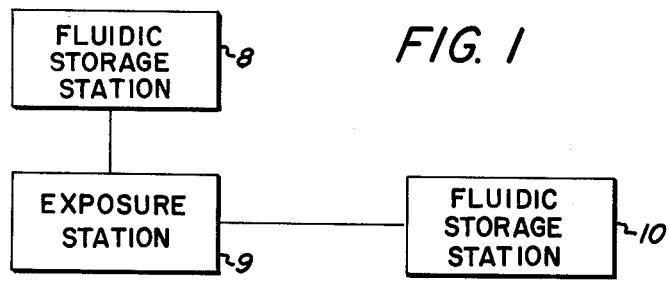
FIG. 1 is a block diagram of document handling apparatus, according to the invention.

An embodiment of document handling apparatus, according to the invention, is shown in block diagram from in FIG. 1. In general, the apparatus includes a fluidic storage station 8 which is used to store documents and to serially feed documents into registration at a xerographic exposure station 9. After exposure, the documents are fluidically moved to another fluidic storage station 10, which is similar to station 8. In moving from storage station 8 to exposure station 9 and from station 9 to storage station 10, the documents follow a transverse path. If desired, the functions of stations 8 and 10 may be reversed to re-expose documents.

Figure 2:
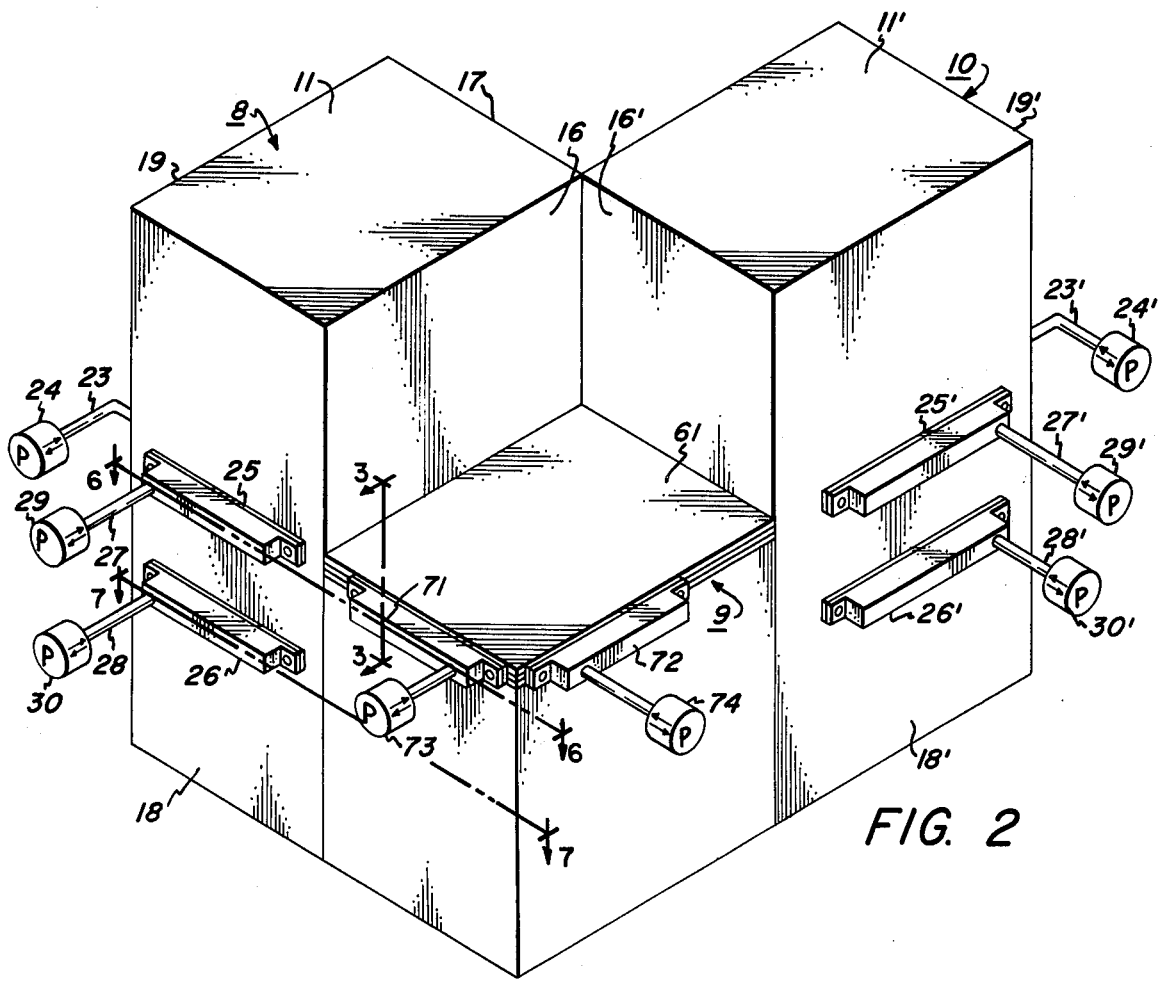
FIG. 2 is a perspective view of document handling apparatus, according to the invention.
Figure 6:
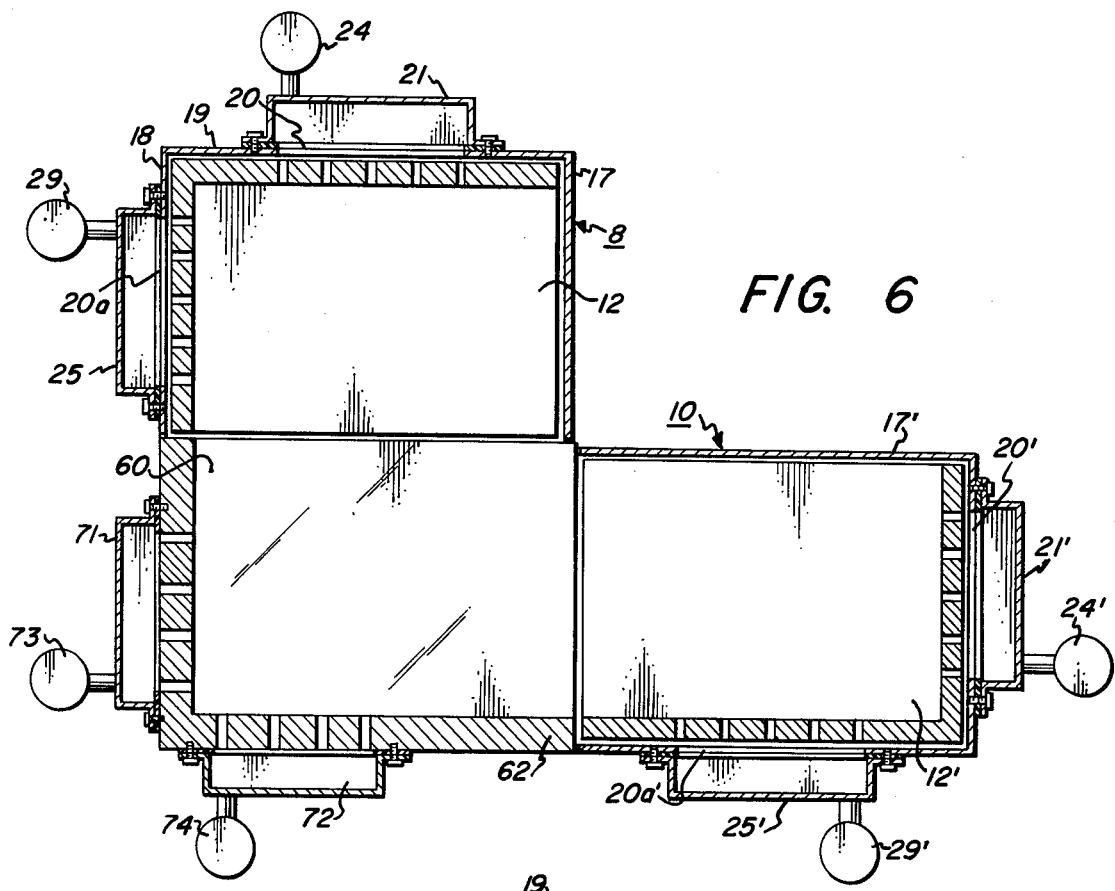
FIG. 6 is a cross-sectional view taken along lines 6—6 in FIG. 2.

Referring to FIGS. 2 and 3, a station for storing documents 8, according to the invention, includes a generally rectangular housing 11 within which there is mounted a rack 12 and means for moving the rack up and down 13. Housing 11 includes a horizontal opening 14 on a wall 16 and a horizontal opening 15 on a wall 17. Each of walls 18 and 19 includes horizontally disposed slots 20 and 20a (see FIG. 6), respectively, at the same level as the opening 14 and wall 18 includes a horizontally disposed slot 20b (see FIG. 7) at the same level as the opening 15. Wall 19 supports a manifold 21 having a chamber 22 communicating with slot 20 and manifold 21 is coupled by a conduit 23 to a reversible pump 24. Similarly, wall 18 supports manifolds 25 and 26, each having a chamber communicating with one of the slots. Manifolds 25 and 26 are coupled, respectively, by conduits 27 and 28 to pumps 29 and 30.

Rack 12 is a rectangular structure having a plurality of superposed pockets 31-35 (not all shown) horizontally extending from a front side of the structure 36. In addition, the rack includes a plurality of sets of holes 37-41 (not all shown), each set extending through the back side 42 of the structure and communicating with a different one of the pockets; and a plurality of groups of holes 43-47, each group extending through a side wall of the structure and communicating with a different one of the pockets. As shown in FIGS. 3 and 4, the rack may be manufactured from rectangular plates 48-53 (not all shown); L-shaped spacers 54-58 (not all shown) interposed between plates, each of the spacers including one of said sets of holes and one of the group of holes; and means for securing the spacers and plates together. Typically, the spacers and plates are fixed to each other with an adhesive; but, bolts (not shown) extending vertically through the plates and spacers and nuts cooperating therewith may be used.

Opening 15 (see FIG. 3) is located such that when the rack 12 is in its lowermost position the top pocket of the rack is aligned therewith and its corresponding group of holes is aligned with the lower slot in wall 18. Therefore, if a vacuum pressure is applied to manifold 26 fluid is drawn through the opening, through the pocket, and through a group of holes. As a result, if a document is presented to the opening 15 it is moved into the pocket. If the rack 12 is moved upwardly in increments corresponding to the distance between adjacent pockets, the rack may be filled with documents. Opening 14 is located such that when rack 12 is in its uppermost position the bottom pocket of the rack is aligned therewith. As a result, the group of holes associated with the bottom pocket is aligned with the upper slot in wall 18 and the corresponding set of holes associated with the bottom pocket is aligned with hole 20. As more fully described below, if fluid pressure is applied to manifold 21 when a pocket carrying a document is aligned with opening 14, fluid is injected through a set of holes into the bottom pocket and exits through opening 14, thereby moving a document into the exposure station. Alternatively, with vacuum pressure applied to manifolds 21 and 25, documents moving from the exposure station may be registered with the spacer corresponding to a pocket in alignment with opening 14.

Referring to FIGS. 2, 3, and 5, exposure station 9 includes a transparent rectangular plate 60 and an opaque rectangular plate 61, the plates being fixed in parallel to an L-shaped spacer 62 having a number of holes 63–66 (see FIG. 5) in one leg and a number of holes 67–70 in the other of its legs. A manifold 71 fixed to one leg of the spacer 62 includes a chamber which communicates, via holes 63–66, with the space between the plates and a manifold 72 fixed to the other of the legs includes a chamber which communicates, via holes 67–70, with the space between the plates. Manifolds 71 and 72 are coupled, respectively, to reversible pumps 73 and 74. Therefore, when a pocket of rack 12 is aligned with the space between the plates 60 and 61 if pump 24 provides fluid to manifold 21 and pumps 73 and 74 are operated in a vacuum mode, a document 75 located in the aligned pocket will be moved by a fluid stream into orthogonal registration (see FIG. 5) with the spacer 62. In this embodiment the exposure station is mounted on top of a housing (shown without details in FIG. 2) containing xerographic equipment for making copies of documents located in the exposure station. After the document has been exposed through plate 60, it can be moved, as explained below, into storage apparatus 10 or back into storage apparatus 8. In the latter case, this is accomplished by causing pump 74 to provide fluid to manifold 72 and by causing pumps 24 and 29 to operate in a vacuum mode. In this mode of operation pump 29 and manifold 25 are useful because a document brought into a pocket from the exposure station is registered and is not randomly located so as to rub against the inner sides of the housing.

Referring to FIG. 2, fluidic storage station 10 is similar to station 8 and may be constructed with mirror symmetry. Therefore, corresponding parts shown in the drawings have the same reference numbers and a prime notation. Stations 8 and 10 are located such that walls 16 and 16' are at right angles with respect to each other and, exposure station 9 extends through an opening in wall 16' such as is shown in FIG. 3 and designated 14. Thus, it will be appreciated that with fluid supplied by pump 73 and with pumps 24' and 29' operating in a vacuum mode, a document at the exposure station may be moved into a pocket of a rack in station 10. Alternatively, a document in a properly aligned pocket of a rack in station 10 may be registered at the exposure station if pump 24' supplies pressurized fluid and pumps 73 and 74 are operated in a vacuum mode.

Figure 7:
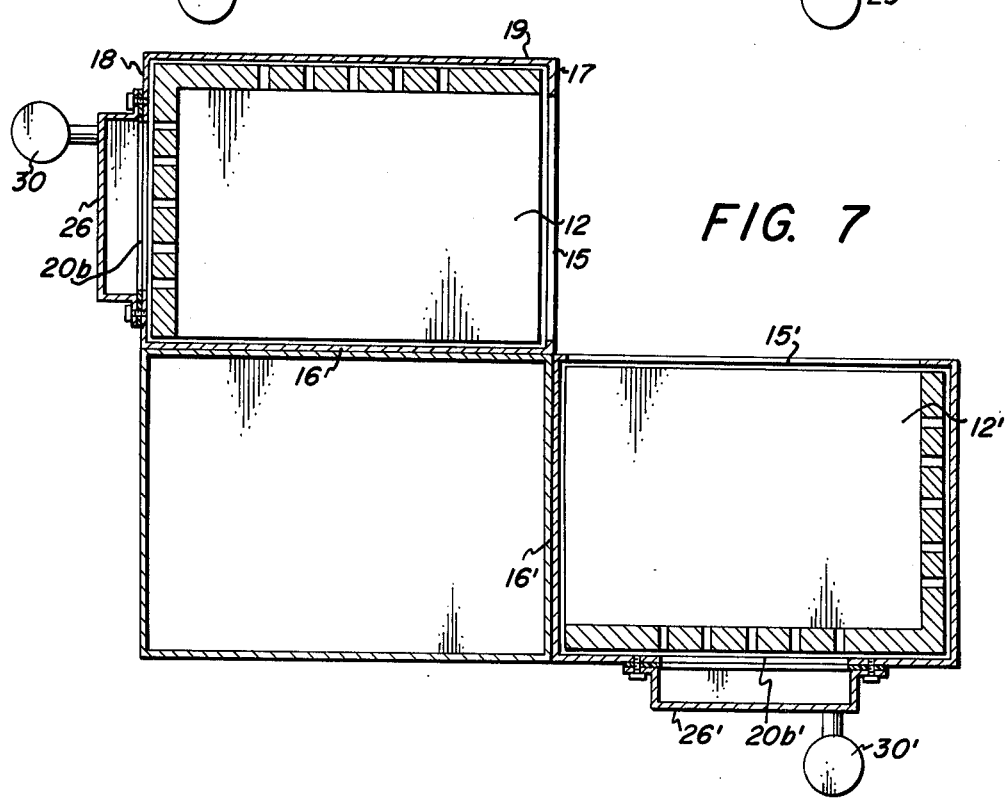
FIG. 7 is a cross-sectional view taken along lines 7—7 in FIG. 2.

Referring to FIGS. 2 and 7, in a typical mode of operation rack 12 is stepped vertically and vacuum pressure supplied by pump 30 sets up a fluid stream which draws documents serially inserted through opening 15 into pockets. Thereafter, rack 12 may be stepped and documents therein may be serially presented to the exposure station with pump 24 supplying fluid and pumps 73 and 74 operating in a vacuum mode (see FIG. 6). In this connection, it should be noted that the fluid supplied should be less than the fluid drawn to insure that a net flow of fluid into the exposure station occurs in the gap between the rack and the exposure station. After a document has been registered at the exposure station, as described above, pumps 24, 73, and 74 are turned off, the rack 12 is stepped and the document is exposed. After exposure pumps 24' and 29' are operated in a vacuum mode and pump 73 operates to provide a fluid, thereby moving the document to a pocket in station 10. Subsequently, pumps 24' and 29' are turned off and the rack of station 10 is stepped. During this motion, pumps 73 and 74 are returned to a vacuum mode and another document is supplied from rack 12. In a similar manner, documents in station 10 may be exposed at station 9 and stored in station 8. Documents may be retrieved from rack 12 (see FIG. 7) with pump 30 supplying fluid as the rack is stepped or from the other rack with pump 30' supplying fluid as it is stepped.

It should be appreciated that pump 30 and manifold 26 may be dispensed with, that opening 15 can be aligned with manifold 25, and that pump 29 may be used to assist in the loading and unloading of documents. However, the presently disclosed arrangements allow documents to be loaded while previously loaded documents are being moved into and out of the exposure station.

In describing exposure station 9, it has been stated that plate 61 is fixed to L-shaped spacer 62. However, plate 61 may be rested on the spacer so as to be removable or pivotable (not shown). In either case, the plate may be moved away from the spacer, a document may be placed on transparent plate 60, the plate may be moved into contact with the spacer, and the document may be exposed. After exposure the document can be moved into an empty pocket of one of the racks or may be removed by opening the exposure station as described above. Obviously, documents in a reck may be unloaded from the apparatus through the exposure station. A further advantage of constructing the exposure station such that plate 61 is movable resides, for example, in that pages of books which would not fit in a pocket may be copied. In addition to or in lieu of the mounting options set forth above, plate 61 may be modified to include on the side normally facing plate 60 a light reflective material so as to enhance the quality of copies produced by the apparatus.

From the foregoing, it will be appreciated that drives for the racks in stations 8 and 10 must be capable of aligning respective pockets with the openings in the housings and as is well known to those skilled in the elevator art, this may be accomplished with motors, pulleys, and sensors or with rack and pinion drives, etc.

It is to be understood that the description herein of a preferred embodiment, according to the invention, has been set forth as an example thereof and is not to be construed or interpreted to provide limitations on the claims which follow and define the invention.

What is claimed is:

1. Document handling apparatus, comprising:
   a. an exposure station including orthogonally related surfaces;
   b. first means for fluidically moving a document in a first direction and into orthogonal registration with said surfaces of the exposure station, a registered document being entirely within the exposure station; said first means including a rack having a plurality of superposed pockets for storing documents, means for aligning each of the pockets with the exposure station, and fluidic means for moving documents in aligned pockets to the exposure station; and
   c. second means for fluidically moving said document in a second direction out of the exposure station; said first and second directions being transversely related.

2. Apparatus as defined in claim 1 wherein the exposure station includes a pair of plates and means for securing one of the plates over the other of the plates with a space in between.

3. Apparatus as defined in claim 2 wherein said means for securing includes an L-shaped spacer having orthogonally related surfaces communicating with the space.

4. Apparatus as defined in claim 1 wherein said rack is located in a housing having an opening and includes: a number of plates; a plurality of spacers; means for fixing the spacers to the plates, each of the spacers being located snugly between a different pair of plates, whereby the pockets are provided; and a plurality of holes extending through the spacers to communicate with the pockets, each spacer having at least one hole.

5. Apparatus as defined in claim 4 wherein said at least one hole is a set of holes and wherein said fluidic means includes means for injecting fluid to any one of the sets of holes when the pocket with which the set communicates is aligned with the opening.

6. Apparatus as defined in claim 5 wherein said means for injecting fluid includes a slot in the housing, a pump, and means for directing fluid from the pump through the slot, the slot being located so as to communicate with said any one of the sets of holes when the pocket with which the set communicates is aligned with the opening.

7. Apparatus as defined in claim 6 wherein said second means includes another rack having a plurality of superposed pockets for storing documents; means for storing documents; means for aligning each of the pockets of said another rack with the exposure station; and second fluidic means for moving documents from the exposure station into aligned pockets.

8. Apparatus as defined in claim 1 wherein the exposure station includes a first plate, a spacer held in abutment with the plate, and a second plate supported by the spacer.

9. Apparatus as defined in claim 8 wherein said orthogonally related surfaces are on said spacer.

10. Document handling apparatus comprising:
  a. an exposure station including a pair of plates and means for securing one of the plates over the other with a space in between, said means for securing including an L-shaped spacer having orthogonally related surfaces communicating with the space, a number of holes in one of its legs and another number of holes in the other of its legs;
  b. first means for fluidically moving a document in a first direction into registration at the exposure station, including a manifold having a chamber communicating with said number of holes and a pump coupled to the manifold for moving fluid through said number of holes; and
  c. second means for fuidically moving said document in a second direction out of the exposure station, said first and second directions being transversely related, including another manifold having a chamber communicating with said another number of holes and another pump coupled to said another manifold for moving fluid through said another number of holes.

11. Apparatus as defined in claim 10 wherein said first means includes a document pocket aligned with said space and fluidic means for injecting fluid into the pocket to move a document towards said space when fluid in the space is being drawn out through the holes in the spacer.

12. Apparatus as defined in claim 11 wherein said second means includes another document pocket aligned with said space and second fluidic means for drawing fluid from the second pocket when a document is in the space and fluid is flowing into the space through said another number of holes.

* * * * *